United States Patent [19]

Cote, Jr. et al.

[11] 4,197,101

[45] Apr. 8, 1980

[54] AIR CLEANER

[75] Inventors: Edmond H. Cote, Jr., Warren; Kenneth A. Conti, Barrington, both of R.I.

[73] Assignee: Fram Corporation, East Providence, R.I.

[21] Appl. No.: 881,969

[22] Filed: Feb. 27, 1978

[51] Int. Cl.[2] .......................... B01D 46/02; F17D 3/16

[52] U.S. Cl. .......................................... 55/419; 55/502; 55/503; 55/505; 137/615; 285/281

[58] Field of Search ................. 55/493, 502, 503, 505, 55/419; 285/272, 281, 325, 326; 210/232; 137/615, 800

[56] References Cited

U.S. PATENT DOCUMENTS

| | | | |
|---|---|---|---|
| 961,216 | 6/1910 | Dew | 285/272 |
| 2,010,424 | 8/1935 | Wilson et al. | 55/503 |
| 2,876,453 | 3/1959 | Flagg et al. | 285/272 |
| 3,329,449 | 7/1967 | Herold et al. | 285/272 |
| 3,385,034 | 5/1968 | Farr | 55/493 |
| 3,850,454 | 11/1974 | Paddington | 285/281 |
| 4,006,000 | 2/1977 | Tortorici et al. | 55/503 |
| 4,065,159 | 12/1977 | Leroy et al. | 285/281 |

FOREIGN PATENT DOCUMENTS

| | | | |
|---|---|---|---|
| 664722 | 6/1963 | Canada | 210/232 |

*Primary Examiner*—David L. Lacey

*Attorney, Agent, or Firm*—Ken C. Decker; William N. Antonis

[57] ABSTRACT

An air cleaner for a heavy duty vehicle comprises a container having an open end for receiving a filter cartridge, and a removable closure for the open end. The closure includes a first portion which defines a central opening which is removably secured to the open end by circumferentially spaced bolts and a second portion comprising an air valve housing which is mounted on the first portion through a swivel connection to permit the air valve housing to pivot relative to the container without removal of the bolts. The air valve housing includes a pair of inlets connected to different air sources, such as to ambient outside air and to heated engine air respectively, and a valve mechanism which opens one of the inlets while the other is closed. Air communicating through the open inlet is communicated through the central opening into the container.

8 Claims, 2 Drawing Figures

AIR CLEANER

BACKGROUND OF THE INVENTION

This invention relates to an air cleaner for a heavy duty vehicle.

Heavy duty air cleaners, of the type used on large trucks, are relatively large and bulky and must often be located in inconvenient locations for servicing. Furthermore, it is often necessary to service these heavy duty air cleaners more often than automotive air cleaners are serviced, since these heavy duty vehicles are often operated in an adverse environment. Air cleaners are serviced by removing the throwaway filter element and installing a new one. Furthermore, the air cleaners used on many vehicles are provide with a pair of inlets, one of which is connected to communicate warm, underhood engine air to the air cleaner, and the other used to communicate the cooler, heavier, ambient air to the air cleaner. A mechanism is provided to open one of the inlets when the other one is closed. The air valve is often mounted on the removable closure of the air cleaner, through which replacement elements cartridges are installed. However, the air valves in prior art devices were often hard to connect to the inlet tube communicating them with the underhood engine air, since it was difficult to install the bolts which hold the air cleaner to the air valve swivel housing after the latter were removed in order to replace the cartridge. Because of the inconvenient location and the interference of the air valve housing, replacing the filter element in many prior art heavy duty air cleaners was often a tedious, relatively difficult task.

SUMMARY OF THE INVENTION

The present invention replaces the relatively fixed air valve housing used on prior art air cleaners with an air valve housing which is connected to the air cleaner through a swivel coupling. The swivel coupling permits the air valve housing to rotate a complete 360 degrees relative to the air cleaner housing, even after the removable closure member has been reinstalled after the filter element has been changed. In this way, the bolts of the filter closure may be tightened without interference of the air valve housing, since the latter can be pivoted out of the way in order to tighten the bolts that would normally interfere with the air valve housing. After all the bolts are tightened, it is a relatively simple matter to swivel the air housing back to the proper position for connection of the inlet with the inlet tube communicating with the warm underhood engine air.

Therefore, an important object of our invention is to facilitate servicing of air cleaner elements used on heavy duty trucks.

Another important object of our invention is to provide a swivel connection between the container housing the filter element of a heavy duty air cleaner and the valve housing which is carried by the removable closure which is removed when a new cartridge is installed, so that the air valve housing may be moved out of the way when the closure member is installed on the container.

Still another important object of our invention is to provide an air cleaner which can be fitted on a large number of different vehicles, due to the swivel connection between the parts of the air cleaner so that relative rotation between the parts accommodates interference between the air cleaner and the vehicle structure.

DETAILED DESCRIPTION

Figure 1:
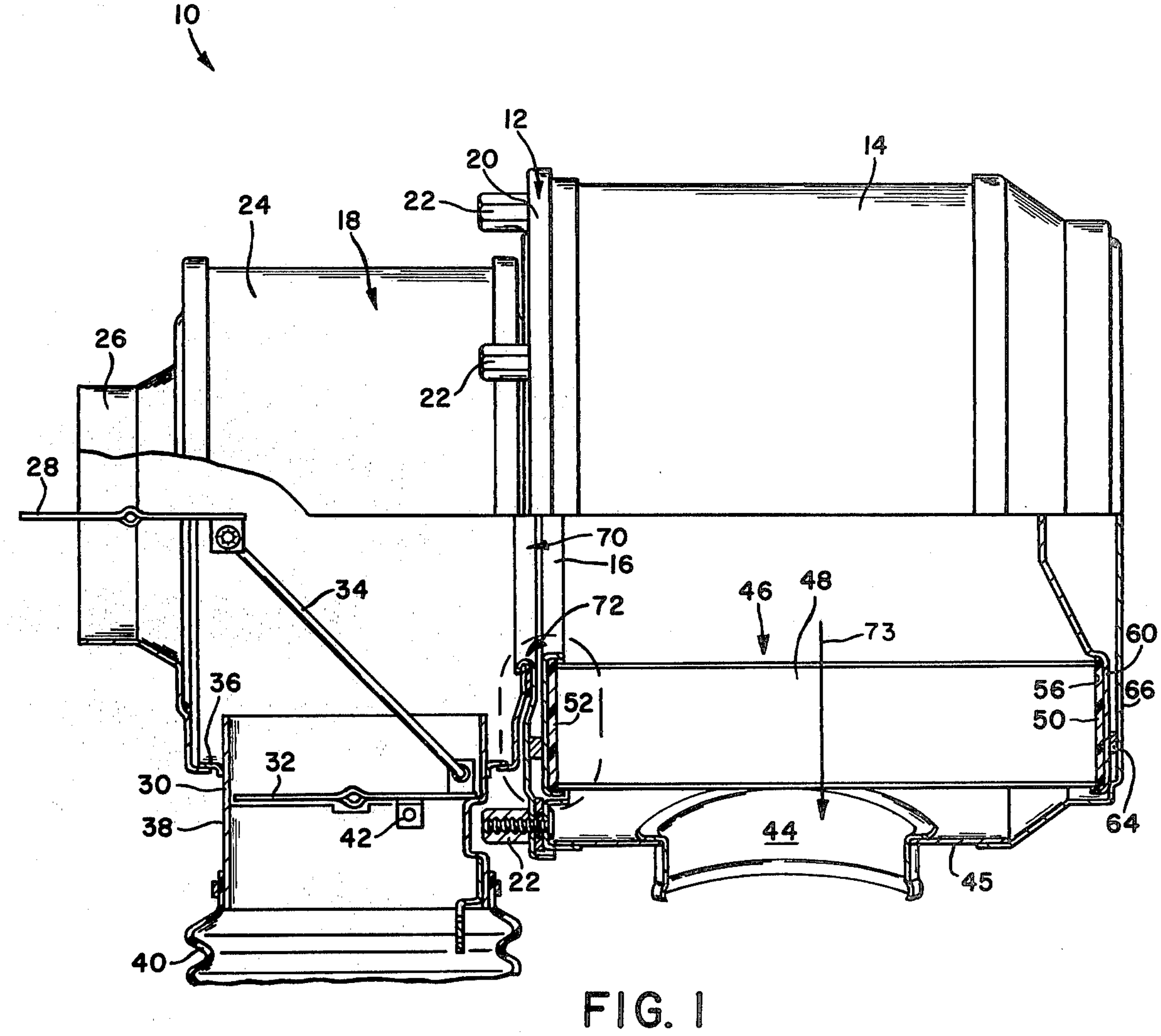
FIG. 1 of the drawing is a side elevational view, partly in section, of a heavy duty air cleaner made pursuant to the teachings of our present invention.
Figure 2:
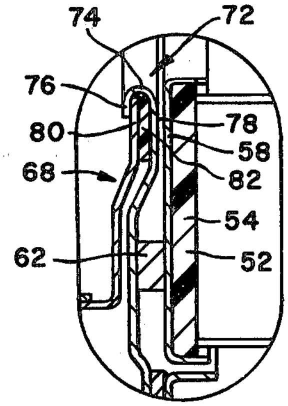
FIG. 2 is an enlarged, detailed view of the circumscribed portion of FIG. 1.

Referring now to the drawing, a heavy duty air cleaner generally indicated by the numeral 10 includes a housing 12 comprising a container 14 having an opened end as at 16 and a conduit element 18 mounted on the opened end 16. The closure 18 includes a member 20 which is complementary to the opened end 16 and which is installed on the latter by circumferentially spaced bolts 22 which are connected to the container 14. Conduit element 18 also includes an annular air valve housing generally indicated by the numeral 24. The air valve housing 24 includes a first inlet 26 controlled by a simple flapper valve 28 and a second inlet 30 controlled by a corresponding flapper valve 32. The valve members 28 and 32 are interconnected by a linkage mechanism 34 in the normal manner well known to those skilled in the art, so that movement of one of the valves 28 and 32 is transmitted to the other valve, such that when one of the valves is closed the other one is open. The inlet 26 is communicated to ambient atmospheric air, and the inlet 30, which extends through the side wall 36 of the air valve housing 24, is provided with a tubular extension 38 which is secured to the side wall 36 and which is adapted to be engaged by an inlet tube 40, which communicates with heated, underhood engine air. In this way, depending upon the position of the valves 28 and 32, either cool, dense, ambient atmospheric air or warm, heated underhood engine air, is communicated into the container 14. A linkage (not shown) is secured to coupling 42, for operating the valve elements 28 and 32.

An outlet 44 is secured to the side wall 45 of the container 14, and communicates with the induction manifold of the vehicle engine. A removable filter cartridge, generally indicated by the numeral 46, includes an annular, pleated paper filtering element 48, a pair of annular end caps 50, 52, each of which comprising a band of molded plastic material 54, 56 and metal caps 58, 60. Annular seals 62, 64 connected to the end caps 50, 52 seal against the closure member 20 and against the bottom wall 66 of container 14 respectively.

The member 20 of conduit element 18, and the end wall 68 of the air valve swivel housing 24, cooperate to define a central opening 70 therein that communicates the interior of the air valve housing 24 with the interior of the container 14, so that air flow through one of the inlets 26 or 30 is communicated through the pleated paper element 48 in the direction of the arrow 73 to the outlet 44, in a manner well known to those skilled in the art. The perimetrical portion of the member 20 of conduit element 18 which defines the opening 70 terminates in a hook generally indicated by the numeral 72 which includes an apex 74 which defines the perimeter of the opening 70, and a terminating portion 76 which extends substantially parallel, but tapers toward, the portion 78 of the closure member 20 adjacent the apex 74. The wall 68 of the air valve housing 24 terminates in a tang 80 which extends into the hook 72. An annular, non-metallic bearing ring 82 is disposed between the tang 80 and the portion 78 of the closure member 20, and the terminating portion 76 of the hook 72 extends slightly inwardly toward the portion 78, to thereby urge the tang 80 into engagement with the ring 82, with sufficient force to provide a frictional drag on the air valve housing 24. Accordingly, because of the swivel connection provided by the hook 72 and the tang 80, the air valve housing 24 is able to swivel relative to the container 14 even after the conduit element 18 is installed on the open end 16 and the bolts 22 secured.

MODE OF OPERATION

When the air cleaner 10 requires servicing, the inlet tube 40 is disconnected from the tubular extension 38, so that the bolts 22 may be removed to permit removal of the conduit element member 18. It will be noted that, with the inlet tube 40 disconnected from the tubular extension 38, that the air valve housing 24 may be rotated relative to the container 14 to permit access to the bolts, even to those bolts which might be obstructed by the extension 38 if the housing 24 did not rotate. After the conduit element 18 is removed by disconnection of all of the bolts 22, the filter cartridge 46 is removed and thrown away and a new cartridge is installed. The conduit element 18 is then reinstalled in position on the container 14, it being noted that, because of the swivel connection between the air valve housing 24 and the member 20 of the conduit element 18, that access to each of the bolts 22 is readily available merely by rotating the air valve housing 24 to bring the extension 38 away from the bolts which would otherwise be concealed by it. After all the bolts 22 are properly installed, the housing 24 is then rotated back into the position illustrated in the drawing, and the inlet tube 40 is then reconnected to the tubular extension 38.

We claim:

1. An air cleaner for the air intake system for a motor vehicle, comprising a container defining a chamber therewithin, an air valve housing having a pair of inlet conduits, swivel connecting means mounting said air valve housing on said container and permitting swivelling movement therebetween, a control valve mounted in said air valve housing controlling communication between said inlet conduits and said chamber, said chamber having an outlet, a filter cartridge in said chamber, said cartridge including a filtering media disposed between said air valve housing and said outlet, said swivel connection comprising a pair of relatively rotatable portions and fastening means connected to said container for securing one of said relatively rotatable portions to said container, said swivel connection permitting the other portion to rotate relative to the one portion when the air valve housing is installed on the container.

2. The air cleaner of claim 1:
wherein one of said inlet conduits includes a tubular extension rotatable with said air valve housing, said extension covering at least a portion of said fastening means whereby said swivel connection permits rotation of the air valve housing to provide access to said fastening means.

3. The air cleaner of claim 2:
wherein said fastening means includes circumferentially spaced fastening devices along the radially outer portion of the one portion and on the container.

4. The air cleaner of claim 3:
wherein said one portion of the swivel connection defines an opening and said other portion of the swivel connection defines a corresponding opening complemental to the opening in the one portion, said one portion having a perimetrical section defining the opening therein, said perimetrical section of said one portion terminating in a circumferentially extending, turned-over portion defining a circumferentially extending hook having a terminating portion extending away from said opening, said other portion having a perimetrical section defining the opening therein, said perimetrical section of said other portion terminating in a circumferentially extending tang received within said hook, the terminating portion of said hook exerting a force against said tang to maintain a frictional drag therebetween.

5. The air cleaner of claim 4:
and further comprising a circumferentially extending bearing circumscribing said openings and disposed between the tang and the section of the one portion adjacent said hook.

6. The air cleaner of claim 1:
wherein said one portion of the swivel connection defines an opening and said other portion of said swivel connection defines a corresponding opening complemental to the opening in the one portion, said one portion having a perimetrical section defining the opening therein, said perimetrical section of said one portion terminating in a circumferentially extending, turned-over portion defining a circumferentially extending hook having a terminating portion extending away from said opening, said other portion having a perimetrical section terminating in a circumferentially extending tang, said tang being received within said hook, the terminating portion of said hook exerting a force against said tang to maintain a frictional drag therebetween.

7. The invention of claim 6:
and further comprising a circumferentially extending bearing circumscribing said openings and disposed between the tang and the section of the one portion adjacent said hook.

8. The air cleaner of claim 1:
wherein said air valve housing includes a projecting portion covering at least a portion of said fastening means whereby said swivel connecting means permits rotation of the air valve housing to provide access to said fastening means.

* * * * *